(12) United States Patent
Tak et al.

(10) Patent No.: US 11,354,143 B2
(45) Date of Patent: Jun. 7, 2022

(54) USER TERMINAL DEVICE AND CONTROL METHOD THEREFOR

(71) Applicant: Samsung Electronics Co., Ltd., Suwon-si (KR)

(72) Inventors: Yoon-sik Tak, Yongin-si (KR); Jong-myeong Ban, Ansan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/754,018

(22) PCT Filed: Aug. 22, 2018

(86) PCT No.: PCT/KR2018/009634
§ 371 (c)(1),
(2) Date: Apr. 6, 2020

(87) PCT Pub. No.: WO2019/117425
PCT Pub. Date: Jun. 20, 2019

(65) Prior Publication Data
US 2020/0401421 A1    Dec. 24, 2020

(30) Foreign Application Priority Data

Dec. 12, 2017  (KR) .......................... 10-2017-0170360

(51) Int. Cl.
*G06F 9/451*  (2018.01)
*G01C 21/36*  (2006.01)
(Continued)

(52) U.S. Cl.
CPC .......... *G06F 9/453* (2018.02); *G01C 21/3676* (2013.01); *G06F 3/14* (2013.01); *G06F 3/167* (2013.01)

(58) Field of Classification Search
CPC . G06F 9/453; G06F 3/14; G06F 3/167; G01C 21/3676
See application file for complete search history.

(56) References Cited

U.S. PATENT DOCUMENTS 10,264,083 B2    4/2019  Pang
2013/0226401 A1*  8/2013  Wang ...................... G06F 16/68
701/36
(Continued)

FOREIGN PATENT DOCUMENTS

JP    2017-134823 A    8/2017
KR    10-1179917 B1    9/2012
(Continued)

OTHER PUBLICATIONS

Extended European Search Report dated Nov. 2, 2020, issued in European Application No. 18889590.8.
(Continued)

*Primary Examiner* — Andrey Belousov
(74) *Attorney, Agent, or Firm* — Jefferson IP Law, LLP

(57) ABSTRACT

The present invention relates to a user terminal device for executing an application or a function provided by the application, and a control method therefor. The present user terminal device comprises: a storage in which use pattern information of an application is stored; and a processor for providing a guide for guiding the execution of a function of at least one of a plurality of functions provided by the application on the basis of the use pattern information according to an execution point of the application when the application is executed.

15 Claims, 11 Drawing Sheets

(51) Int. Cl.
   *G06F 3/14*       (2006.01)
   *G06F 3/16*       (2006.01)

(56) References Cited

U.S. PATENT DOCUMENTS

| | | |
|---|---|---|
| 2013/0252637 A1 | 9/2013 | Cha et al. |
| 2013/0311946 A1 | 11/2013 | Kwon |
| 2014/0188956 A1 | 7/2014 | Subba et al. |
| 2014/0195527 A1 | 7/2014 | Kim et al. |
| 2015/0325136 A1 | 11/2015 | Sedayao et al. |
| 2016/0357774 A1 | 12/2016 | Gauci et al. |
| 2017/0185250 A1 | 6/2017 | Cho et al. |

FOREIGN PATENT DOCUMENTS

| | | | | |
|---|---|---|---|---|
| KR | 10-1233955 B1 | 2/2013 | | |
| KR | 10-2014-0089751 A | 7/2014 | | |
| KR | 10-1510860 B1 | 4/2015 | | |
| KR | 10-2015-0068175 A | 6/2015 | | |
| KR | 20150068175 | * 6/2015 | ............ | G06F 16/21 |
| KR | 10-2017-0077714 A | 7/2017 | | |
| WO | 2017-004139 A1 | 1/2017 | | |

OTHER PUBLICATIONS

Korean Office Action dated Dec. 30, 2021, issued in Korean Patent Application No. 10-2017-0170360.
European Examination Report dated Jan. 11, 2022, issued in European Patent Application No. 18889590.8.

* cited by examiner

USER TERMINAL DEVICE AND CONTROL METHOD THEREFOR

TECHNICAL FIELD

The disclosure relates to a user terminal device and a control method the refor, and more particularly relates to a user terminal device executing an application and a function provided by the application and a control method therefor.

BACKGROUND ART

Various types of electronic devices have been developed and distributed with development of electronic technologies and electronic devices having new user-friendly functionality have been generalized. In addition, electronic devices having automated functions are developed for improving user convenience.

However, the conventional electronic devices simply stored only execution information of a specific function, and did not organically store execution information between a plurality of functions or a plurality of applications.

Further, only a standardized function was provided when a specific application was executed in the electronic device, and the electronic device did not provide or guide a function based on a usage pattern of a user.

Therefore, the conventional electronic device was inconvenient in that a user needed to perform a separate manipulation for executing a function that a user wanted.

DISCLOSURE

Technical Problem

The disclosure has been made to address the aforementioned needs, and an object of the disclosure is to provide a user terminal device generating usage pattern information regarding an application and a function provided by the application, and providing a guide leading to execution of a function for each situation based on the usage pattern information, and a control method therefor.

Technical Solution

According to an embodiment of the disclosure for achieving the aforementioned object, there is provided a user terminal device including: a storage storing usage patter information of an application, and a processor configured to, based on the application being executed, provide a guide leading to execution of at least one function among a plurality of functions provided by the application based on the usage pattern information according to an execution point of the application.

The usage pattern information of the application may include information regarding time when each of the plurality of functions is executed, and the processor may be configured to obtain information regarding the at least one function executed at the execution point of the application based on the information regarding time when each of the plurality of functions is executed.

The usage pattern information of the application may include information regarding another application additionally executed after execution of each of the plurality of functions, and the processor may be configured to, based on the at least one function being executed by inputting a user command according to the guide, execute the another application based on the usage pattern information of the application.

The processor may be configured to, based on the at least one function being executed by inputting a user command according to the guide, provide a guide leading to execution of at least one sub-function among a plurality of sub-functions corresponding to the executed function based on the usage pattern information.

The device may further include a sensor, and the processor may be configured to execute the application based on a context of the user terminal device detected through the sensor.

The usage pattern information of the application may include information regarding time when each of the plurality of functions is executed for each position of the user terminal device, and the processor may be configured to obtain information regarding the at least one function based on information regarding position of the user terminal device and time when each of the plurality of functions is executed.

The processor may be configured to provide a guide leading to execution of the at least one function based on information regarding a function executed within a predetermined time section based on an execution point of the application.

The processor may be configured to, based on a number of times of execution of the function of the application in the predetermined time being equal to or more than a predetermined number of times, generate and store the usage pattern information including the predetermined time and the function.

The device may further include a speaker, and a display, and the processor may be configured to control at least one of the speaker and the display to output at least one of a sound and a GUI corresponding to the guide.

According to another embodiment of the disclosure, there is provided a method for controlling a user terminal device, the method including storing usage pattern information of an application, based on the application being executed, providing a guide leading to execution of at least one function among a plurality of functions provided by the application based on the usage pattern information according to an execution point of the application.

The usage pattern information of the application may include information regarding time when each of the plurality of functions is executed, and the providing a guide may include obtaining information regarding the at least one function executed at the execution point of the application based on the information regarding time when each of the plurality of functions is executed.

The usage pattern information of the application may include information regarding another application additionally executed after execution of each of the plurality of functions, and the method further may include, based on the at least one function being executed by inputting a user command according to the guide, executing the another application based on the usage pattern information of the application.

The method may further include, based on the at least one function being executed by inputting a user command according to the guide, providing a guide leading to execution of at least one sub-function among a plurality of sub-functions corresponding to the executed function based on the usage pattern information.

The method may further include detecting a context of the user terminal device, and executing the application based on the detected context.

The usage pattern information of the application may include information regarding time when each of the plurality of functions is executed for each position of the user terminal device, and the providing a guide may include obtaining information regarding the at least one function based on information regarding position of the user terminal device and time when each of the plurality of functions is executed.

The providing a guide may include providing a guide leading to execution of the at least one function based on information regarding a function executed within a predetermined time section based on an execution point of the application.

The providing a guide may include, based on a number of times of execution of the function of the application in the predetermined time being equal to or more than a predetermined number of times, generating and storing the usage pattern information including the predetermined time and the function.

The providing a guide may include outputting at least one of a sound and a GUI corresponding to the guide through at least one of a speaker and a display.

According to still another embodiment of the disclosure, there is provided a non-transitory computer-readable medium storing computer instructions to enable a user terminal device to execute operation, in which the operation includes storing usage pattern information of an application, and, based on the application being executed, providing a guide leading to execution of at least one function among a plurality of functions provided by the application based on the usage pattern information according to an execution point of the application.

Effect of Invention

According to various embodiments of the disclosure described above, the user terminal device may, based on the application being executed, provide a guide leading to execution of the function provided by the application based on the usage pattern information, and accordingly, an operation of additional control for executing a function that a user want to execute may be omitted.

DETAILED DESCRIPTION OF EXEMPLARY EMBODIMENTS

Hereinafter, embodiments of the disclosure will be described in detail with reference to the accompanying drawings.

Figure 1A:
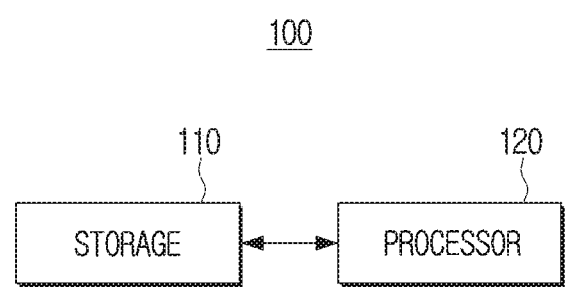
FIG. 1A is a block diagram showing components of a user terminal device according to an embodiment.

FIG. 1A is a block diagram showing components of a user terminal device 100 according to an embodiment of the disclosure. Referring to FIG. 1A, the user terminal device 100 includes a storage 110 and a processor 120.

The user terminal device 100 may be various user terminal devices. For example, the user terminal device may be implemented as various devise such as a digital camera, an MP3 player, a PMP, a smartphone, a cellular phone, smart glasses, a tablet PC, a smart watch, a navigation system, and the like. However, this is merely an embodiment, and the user terminal device 100 may be any device, as long as it is able to execute an application.

The storage 110 may store usage pattern information of the application. For example, the storage 110 may store information indicating that a first application is executed at 11:00 a.m. However, this is merely an embodiment, and the storage 110 may store execution information of a plurality of applications installed in the user terminal device 100.

The storage 110 may store usage pattern information of the application including information regarding time when each of a plurality of functions is executed. For example, the storage 110 may store information indicating that a first function of the first application is executed at 11:00 a.m. However, this is merely an embodiment, and the storage 110 may store execution information of other functions such as a second function of the first application. In addition, the storage 110 may store execution information of a function provided by a second application.

The execution information herein comprises position information of the user terminal device, in addition to information regarding a type of an application, a type of function, and execution time. That is, the storage 110 may store usage pattern information of the application including information regarding time when each of a plurality of functions is executed at each position of the user terminal device.

The storage 110 may store usage pattern information of the application including information regarding another application additionally executed after execution of each of the plurality of functions. For example, the storage 110 may store usage pattern information including information indicating that the second application is executed after executing the first function of the first application.

In addition, the storage 110 may store usage pattern information of the application including execution information of a sub-function corresponding to the executed function after executing each of the plurality of functions. For example, the storage 110 may store one piece of execution information of a sub-function of setting a receiver, a sub-function of inputting a text, and a sub-function of attaching an image and the like, after executing a message writing function in a messaging application.

In addition, the storage 110 may store the usage pattern information of the application by dividing into a plurality of time sections. The usage pattern information will be described later in detail.

The storage 110 may be implemented as a storage medium such as a memory, a HDD, or an SDD and may be any device, as long as it may store data.

The processor 120 generally controls operations of the user terminal device 100.

According to an embodiment, the processor 120 may be implemented as a digital signal processor (DSP), a microprocessor, or a time controller (TCON). However, there is no limitation thereto, and the processor 120 may include one or more of a central processing unit (CPU)), a micro controller unit (MCU), a micro processing unit (MPU), a controller, an application processor (AP), or a communication processor (CP), and an ARM processor or may be defined as the corresponding term. In addition, the processor 120 may be implemented as a system on chip (SoC) or a large scale integration (LSI) in which a processing algorithm is embedded, or may be implemented as a field programmable gate array (FPGA).

When an application is executed, the processor 120 may provide a guide leading to execution of at least one function among a plurality of functions provided by the application based on usage pattern information according to an execution point of the application. For example, when a navigation application is executed, the processor 120 may provide a guide such as "Please enter destination" based on usage pattern information according to a first execution point. In this case, the usage pattern information according to the first execution point may be information generated based on a usage pattern in that a destination is input after executing the navigation application.

In addition, when the navigation application is executed, the processor 120 may provide a guide such as "Do you want to set company A as destination?" based on usage pattern information according to a second execution point. In this case, the usage pattern information according to the second execution point may be information generated based on a usage pattern in that the company A is repeatedly input as a destination after executing the navigation application.

When a music application is executed, the processor 120 may provide a guide such as "Which music folder do you want to open?" based on usage pattern information according to a first execution point. In this case, the usage pattern information according to the first execution point may be information generated based on a usage pattern in that one of a plurality of music folders is selected after executing the music application.

In addition, when the music application is executed, the processor 120 may provide a guide such as "Do you want to play Top 100 songs?" based on usage pattern information according to a second execution point. In this case, the usage pattern information according to the second execution point may be information generated based on a usage pattern in that Top 100 songs are repeatedly played after executing the music application.

When a flight booking application is executed, the processor 120 may provide a guide such as "Enter departure location, destination, departure date, return date, and travel class" based on usage pattern information according to an execution point of the flight booing application. In this case, the usage pattern information according to the execution point of the flight booking application may be information generated based on a usage pattern in that the departure location and the like are set after executing the flight booking application.

When a webtoon application is executed, the processor 120 may provide a guide such as "Do you want to read Webtoon A?" based on usage pattern information according to an execution point of the webtoon application. In this case, the usage pattern information according to the execution point of the webtoon application may be information generated based on a usage pattern in that the Webtoon A is repeatedly viewed after executing the webtoon application.

When a messaging application is executed, the processor 120 may provide a guide such as "Who do you want to send a message?" based on usage pattern information according to an execution point of the messaging application. In this case, the usage pattern information according to the execution point of the messaging application may be information generated based on a usage pattern in that a message is input after executing the messaging application.

The usage pattern information of the application may include information regarding time when each of a plurality of functions is executed, and the processor 120 may obtain information regarding at least one function executed at the execution point of the application based on the information regarding the time when each of the plurality of functions is executed.

For example, when the music application is executed at 11:00 a.m., the processor 120 may obtain usage pattern information of a function executed at 11:00 a.m. among functions provided by the music application. When the obtained information is information indicating the play of Top 100 songs, the processor 120 may provide a guide such as "Do you want to play Top 100 songs?".

However, there is no limitation thereto, and the processor 120 may obtain usage pattern information for a predetermined time section including the execution point of the application. For example, when the music application is executed at 11:20 a.m., the processor 120 may obtain usage pattern information of a function executed from 11:00 a.m. to 12:00 a.m. among the functions provided by the music application.

The predetermined time section herein may be a time section that is set in advance. For example, the processor 120 may set a time section by the hour in advance, and store the usage pattern information for each time section.

In addition, the predetermined time section may be time set based on the execution point of the application. For example, the processor 120 may store time when a function is executed as the usage pattern information, without setting the time section. In this case, when the music application is executed at 11:23 a.m., the processor 120 may obtain usage pattern information of a function executed from 10:53 a.m. to 11:53 a.m. among functions provided by the music application.

The time section has been described by the hour for convenience of description, but there is no limitation thereto. For example, the time section may be 30 minutes and may be set with any other time section.

The usage pattern information of the application includes information regarding another application additionally executed after executing each of the plurality of functions, and when at least one function is executed by inputting a user command according to the guide, the processor 120 may execute the another application based on the usage pattern information of the application.

For example, the processor 120 may store information indicating that a guide function is executed in the navigation application by setting a destination and then the music application is executed, as the usage pattern information. Since then, when the guide function is executed in the navigation application by setting a destination according to a user command, the processor 120 may execute the music application.

When the music application is executed, the processor 120 may provide a guide leading to execution of at least one function among a plurality of functions provided by the music application based on the usage pattern information.

In addition, when the guide function is executed in the navigation application by setting a destination according to a user command, the processor 120 may provide a guide such as "Do you want to open music application?". That is, when at least one function is executed by inputting a user command according to the guide, the processor 120 may provide a guide for execution of the another application based on the usage pattern information of the application.

When at least one function is executed by inputting a user command according to the guide, the processor 120 may provide a guide leading to execution of at least one sub-function among a plurality of sub-functions corresponding to the executed function based on the usage pattern information.

For example, in a state where the webtoon application is executed and a guide such as "Which webtoon do you want to read?" is provided, when the latest episode of the Webtoon A is displayed by inputting a user command indicating reading of the webtoon A, the processor 120 may provide a guide leading to execution of a sub-function such as "Do you want episode list of webtoon A?".

The usage pattern information of the application includes information regarding time when each of the plurality of functions is executed at each position of the usage terminal device 100, and the processor 120 may obtain information regarding at least one function based on information regarding the position of the user terminal device 100 and time when each of the plurality of functions is executed.

For example, when the navigation application is executed and the guide function according to destination setting is executed at 7:00 p.m., the processor 120 may generate usage pattern information including not only information indicating that the guide function of the navigation application is executed at 7:00 p.m., but also position information indicating that the position of the user terminal device 100 at 7:00 p.m. is a car park of the company. Since then, when the position of the user terminal device 100 is a car park of the company and the navigation application is executed at 7:00 p.m., the processor 120 may provide a guide inquiring about execution of the guide function to the same destination based on the usage pattern information stored in advance. Although the navigation application is executed at 7:00 p.m., if the position of the user terminal device 100 is not the car park of the company, the processor 120 may not obtain the usage pattern information stored in advance and may not provide a guide.

The processor 120 may identify a region within a predetermined distance from position information stored in the usage pattern information as the same position. For example, the usage pattern information may information including position information indicating that the position of the user terminal device 100 at 7:00 p.m. is the car park of the company, but when the position of the user terminal 100 is outside of the car park of the company but within a predetermined distance from the car park of the company and the navigation application is executed at 7:00 p.m., the processor 120 may provide a guide inquiring about execution of the guide function to the same destination based on the usage pattern information stored in advance.

The processor 120 may provide a guide leading to execution of at least one function based on information regarding a function executed within the predetermined time section based on the execution point of the application.

For example, when the navigation application is executed at 7:30 p.m., the processor 120 may obtain usage pattern information of a function executed from 7:00 p.m. to 8:00 p.m., and provide a guide based on the obtained usage pattern information.

If the number of pieces of usage pattern information during the predetermined time section is more than one, the processor 120 may obtain only usage pattern information including time information closest to the execution point of the application.

If the number of times of execution of the function of the application at predetermined time is equal to or more than a predetermined number of times, the processor 120 may generate and store usage pattern information including the predetermined time and function. That is, the processor 120 may generate usage pattern information from information indicating usage of the function of the application.

For example, when the guide function of the navigation application is executed at 7:23 p.m., the processor 120 may store this as usage information. Since then, pieces of usage information indicating the execution of guide function of the navigation application at 7:23 p.m., 7:21 p.m., 7:25 p.m., and the like may be accumulated. When the number of pieces of usage information indicating the execution of the guide information of the navigation application stored from 7:00 p.m. to 8:00 p.m. is equal to or more than the predetermined number, the processor 120 may generate this as usage pattern information.

In this case, the processor 120 may provide a guide based on only the usage pattern information. That is, the processor 120 may not provide a guide based on the usage information.

The user terminal device 100 may further include a sensor, and the processor 120 may execute an application based on a context of the user terminal device 100 detected through a sensor.

For example, when the position of the user terminal device 100 is the car park of the company from 7:00 p.m. 8:00 p.m., the processor 120 may execute the navigation application.

At this time, the user terminal device 100 may be in a state where the usage pattern information of the application in which the context and the execution information of the application are matched is stored in advance. That is, when the application is executed, the processor 120 may generate the usage pattern information of the application by including context information of the user terminal device 100.

The user terminal device 100 may further include a speaker and a display, and the processor 120 may control at least one of the speaker and the display to output at least one of a sound and a GUI corresponding to the guide.

The processor 120 may consecutively provide a guide according to a response of a user. For example, when an email application is executed, the processor 120 may provide a guide such as "Do you want to delete junk mail?" based on usage pattern information indicating that junk mails are deleted after executing the email application. With respect to this, when a user instructs to delete a junk mail, the processor 120 may delete the junk mail.

Then, the processor 120 may provide a guide such as "Do you want to load on-line community page?" based on usage pattern information indicating that on-line community is visited after deleting the junk mail.

As described above, the processor 120 may consecutively provide a guide based on the usage pattern information.

Figure 1B:
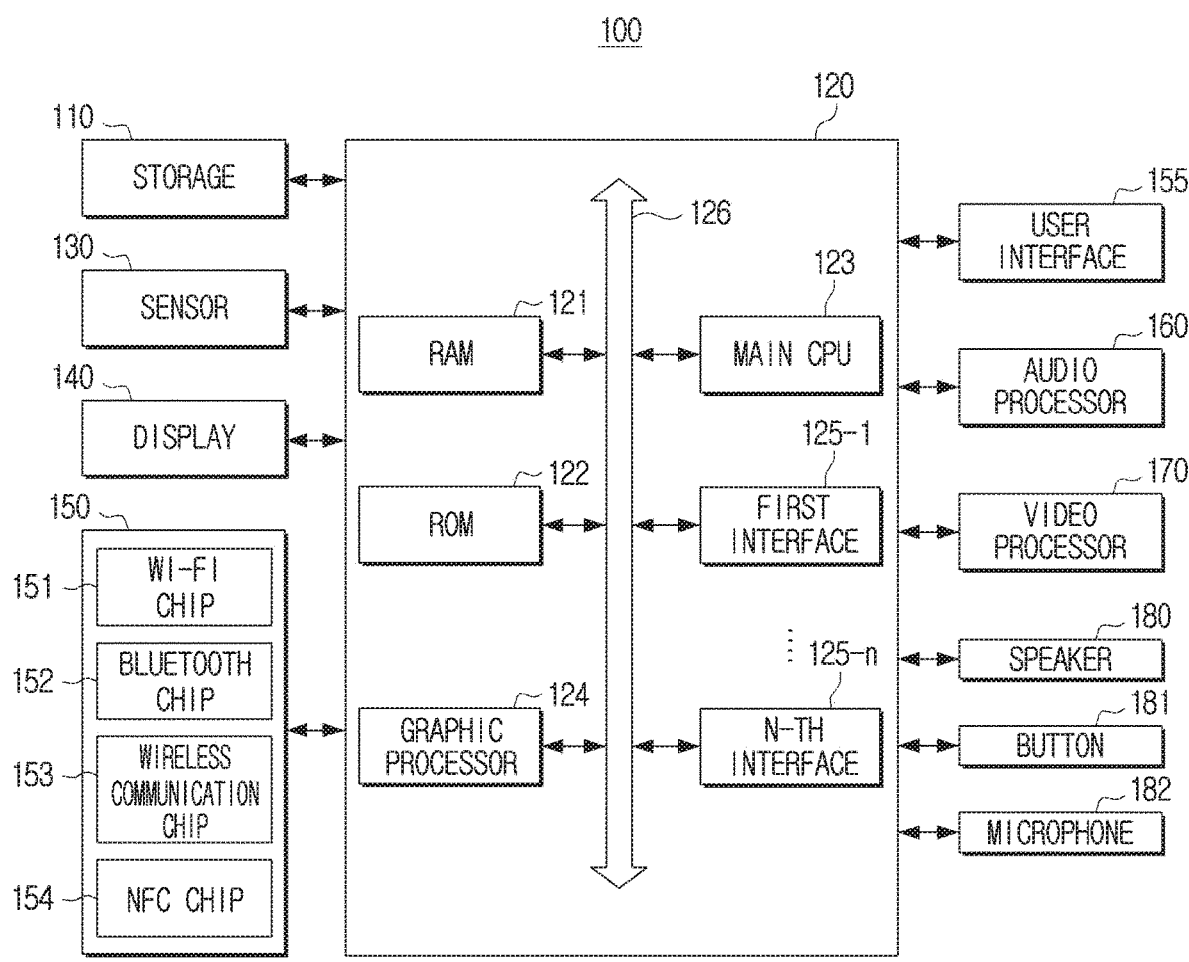
FIG. 1B is a block diagram showing an example of specific components of the user terminal device.

FIG. 1B is a block diagram showing an example of specific components of the user terminal device 100. Referring to FIG. 1B, the user terminal device 100 may include the storage 110, the processor 120, a sensor 130, a display 140, a communicator 150, a user interface 155, an audio processor 160, a video processor 170, a speaker 180, a button 181, and a microphone 182. Among the components shown in FIG. 1B, specific description of the parts overlapped with the components shown in FIG. 1A will be omitted.

The processor 120 generally controls the operation of the user terminal device 100 by using various programs stored in the storage 110.

Specifically, the processor 120 may include a RAM 121, a ROM 122, a main CPU 123, a graphic processor 124, first to n-th interfaces 125-1 to 125-n, and a bus 126.

The RAM 121, the ROM 122, the main CPU 123, the graphic processor 124, and the first to n-th interfaces 125-1 to 125-n may be connected to each other via the bus 126.

The first to n-th interfaces 125-1 to 125-n are connected to the various components described above. One of the interfaces may be a network interface connected to an external device through a network.

The main CPU 123 accesses the storage 110 and executes booting by using an O/S stored in the storage 110. Then, the main CPU 123 executes various operations by using various programs stored in the storage 110.

The ROM 122 may store a set of commands for system booting. When a power is supplied by inputting a turn-on command, the main CPU 123 may copy the O/S stored in the storage to the RAM 121 according to the command stored in the ROM 122 and boot a system by executing the O/S. When the booting is completed, the main CPU 123 may copy various application programs stored in the storage 110 to the RAM 121, and execute various operations by executing the application programs copied to the RAM 121.

The graphic processor 124 generates a screen including various objects such as icons, images, and texts by using a calculator (not shown) and a rendering unit (not shown). The calculator (not shown) calculates attribute values such as a coordinate value at which each object is displayed, a shape, a size, or a color thereof according to a layout of the screen, based on a received control instruction. The rendering unit (not shown) generates a screen of various layouts including objects based on attribute values calculated by the calculator (not shown). The screen generated by the rendering unit (not shown) is displayed in a display region of the display 150.

The operations of the processor 120 described above may be performed by programs stored in the storage 110.

The storage 110 stores various pieces of data such as an operating system (O/S) software module for driving the user terminal device 100, an application driving module, a usage pattern information module and a guide providing module of the application, and the like.

The sensor 130 may detect a context of the user terminal device 100. The sensor 130 may include a touch sensor, a geomagnetic sensor, a gyro sensor, an acceleration sensor, a proximity sensor, a grip sensor, a GPS sensor, an illuminance sensor, and the like. The sensor 130 may detect various manipulations such as rotating, tilting, pressing, approaching, grip, and the like.

The touch sensor may be implemented as an electrostatic type or a pressure-sensitive type. The electrostatic touch sensor means a sensor which, when a part of a body of a user touches a surface of a display, detects micro electricity excited from a body of a user by using a dielectric coated over the surface of the display and calculates a coordinate of the touched point. The pressure-sensitive touch sensor means a sensor which includes two electrode plates embedded in the user terminal device 100, detects a flow of a current due to a contact of upper and lower plates of a touched point, when a user touches the surface, and calculates a coordinate of the touched point. In addition, an infrared detection type, a surface ultrasonic conduction type, an integrated tension measurement type, or a piezoelectric effect type may be used for detecting touch interactions.

Further, the user terminal device 100 may determine whether or not a touch object such as a finger or a stylus pen comes into contact or approaches by using a magnetic and a magnetic field sensor, an optical sensor, or a proximity sensor, instead of the touch sensor.

The geomagnetic sensor is a sensor for detecting a rotation state, a moving direction, and the like of the user terminal device 100. The gyro sensor is a sensor for detecting a rotation angle of the user terminal device 100. Both the geomagnetic sensor and the gyro sensor may be provided, but the user terminal device 100 may detect the rotation state, even when one of these is provided.

The acceleration sensor is a sensor for detecting a tilt of the user terminal device 100.

The proximity sensor is a sensor for detecting a motion of an object nearby without any physical contact to the surface of the display. The proximity sensor may be implemented in various sensors of a high-frequency oscillation type for forming a high-frequency electric field and detecting a current induced by the electric field property changing when an object is approaching, a magnetic type using a magnet, or a capacitance type for detecting capacitance changing due to the object approaching.

The grip sensor is a sensor disposed at a rear surface, an edge, or a handle portion to detect the grip of a user, separately from the touch sensor provided on the touch screen. The grip sensor may be implemented as a pressure sensor in addition to the touch sensor.

The GPS sensor is a sensor for detecting the position of the user terminal device 100 by using satellites. However, there is no limitation thereto, and if the user terminal device 100 is a device executing communication with a base station such as a smartphone, the processor 120 may detect the position of the user terminal device 100 based on a signal received from the base station.

The illuminance sensor is a sensor for detecting ambient illuminance of the user terminal device.

The display 140 may be implemented as various types of displays such as a liquid crystal display (LCD), organic light emitting diodes (OLED) display, a plasma display panel (PDP), and the like. The display 140 may include a driving circuit that may be implemented in a form of an a-si TFT, a low temperature poly silicon (LTPS) TFT, an organic TFT (OTFT), and a backlight unit. The display 140 may be implemented as a touch screen by combining with a touch detector.

The communicator 150 is a component performing communication with various types of external devices according to various types of communication methods. The communicator 150 includes a Wi-Fi chip 151, a Bluetooth chip 152, a wireless communication chip 153, and an NFC chip 154. The processor 120 executes communication with various external devices by using the communicator 150.

The Wi-Fi chip 151 and the Bluetooth chip 152 executes the communication by a Wi-Fi system and a Bluetooth system, respectively. When using the Wi-Fi chip 151 or the Bluetooth chip 152, various pieces of connection information such as SSID or session keys may be first transmitted and received for communication connection using these, and then, various pieces of information may be transmitted and received. The wireless communication chip 153 means a chip executing the communication based on various communication standards such as IEEE, zigbee, 3rd generation (3G), long term evolution (LTE). The NFC chip 154 means a chip operating in a near field communication (NFC) system in which a band of 13.56 MHz is used among various RF-ID frequency bands such as 135 kHz, 13.56 MHz, 433 MHz, 860-960 MHz, and 2.45 GHz.

The user interface 155 receives various user interactions. The user interface 155 may be implemented in various types according to an implementation example of the user terminal device 100. For example, the user interface 155 may be a button, a microphone receiving a user's speech, or a camera detecting a user's motion, provided in the user terminal device 100. In addition, if the user terminal device 100 is implemented as a touch-based user terminal device, the user interface 155 may be implemented in a form of a touch screen forming a layer structure with a touch pad. In this case, the user interface 155 may be used as the display 150 described above.

The audio processor 160 is a component executing processing regarding audio data. The audio processor 160 may execute various processing such as decoding, amplification, or noise filtering regarding the audio data.

The video processor 170 is a component executing processing regarding video data. The video processor 170 may execute various image processing such as decoding, scaling, noise filtering, frame rate conversion, or resolution conversion regarding the video data.

The speaker 180 is a component outputting various alerts or voice messages, in addition to various pieces of audio data processed by the audio processor 160.

The button 181 may be various types of buttons such as a mechanical button, a touch pad, or a wheel formed in any region of a front portion, a side portion, or a rear portion of the appearance of the main body.

The microphone 182 is a component for receiving a user's speech or other sounds and converting these into audio data.

Through the method described above, the processor 120 may provide a guide leading to execution of at least one function of the plurality of functions provided by the application.

Hereinafter, the operations of the user terminal device 100 will be described in detail with reference to the drawings.

Figure 2A:
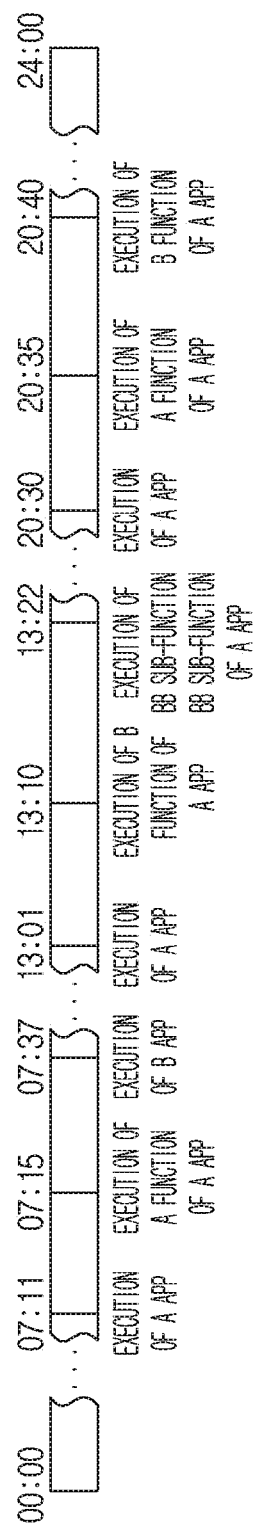
FIGS. 2A and 2B are views for describing usage pattern information according to various embodiments.
Figure 2B:
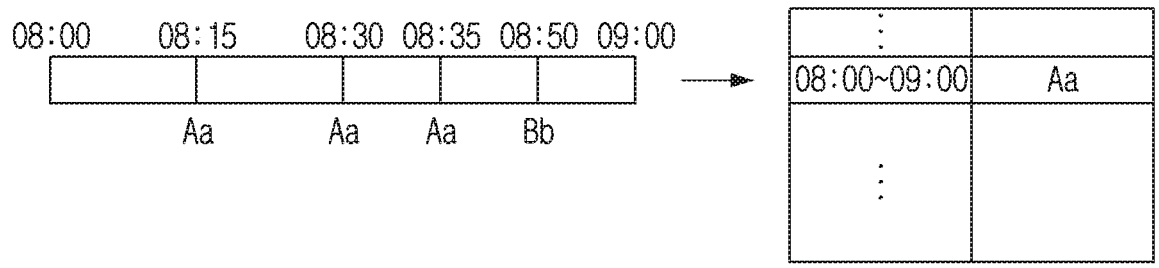

FIGS. 2A and 2B are views for describing usage pattern information according to various embodiments of the disclosure.

As shown in FIG. 2A, the processor 120 may store an execution point of the application, an execution point of the function provided by the application, and the like in the storage 110. For example, when a user executes an application A at 7:11 a.m., executes a function a provided by the application A at 7:15 a.m., and then executes an application B at 7:37 a.m., the processor 120 may store execution information of the application A, execution information of the function a provided by the application A, and execution information of the application B in the storage 110. At this time, the processor 120 may additionally store a position, a grip state, an ambient temperature, illuminance, and the like of the user terminal device 100, in addition to the execution time of the application or the function. The additionally stored information may be any information as long as it is information detected by the user terminal device 100.

The processor 120 may store the execution information of the application A and the execution information of the function a, only in a case where the execution point of the application A and the execution point of the function a are within the predetermined time. In addition, the processor 120 may store the execution information of the function a and the execution information of the application B, only in a case where the execution point of the function a and the execution point of the application B are within the predetermined time.

By the similar usage method, the processor 120 may store execution information of the application A, the execution information of a function b provided by the application A, and execution information of a sub-function bb of the function b provided by the application A after 13:00 in the storage 110. In addition, the processor 120 may store execution information of the application A, the execution information of the function a provided by the application A, and execution information of the function b provided by the application A after 20:00 in the storage 110.

The processor 120 may use the execution information of the application or the function itself as the usage pattern information. However, there is no limitation thereto, and the processor 120 may generate usage pattern information separately from the execution information of the application or the function, and this will be described in FIG. 2B.

When the application A is executed at 7:11 a.m. after the execution information is stored in the storage 110, the processor 120 may provide a guide leading to execution of the function a. The execution of the application A at 7:11 a.m. is merely an embodiment, and the processor 120 may provide a guide leading to execution of the function a, when the application A is executed in a predetermined time section based on 7:11 a.m. For example, when the predetermined time section is 20 minutes, the processor 120 may provide a guide leading to execution of the function a, when the application A is executed from 7:01 a.m. to 7:21 a.m.

Then, when the function a is executed, the processor 120 may execute the application B. However, there is no limitation thereto, and the processor 120 may provide a guide leading to execution of the application B.

FIG. 2A shows the execution information of 24 hours as a graph, but this is merely an embodiment, and the execution information may be stored in any other forms such as a table.

In addition, the processor 120 may store execution information during the predetermined time to be overlapped on the graph shown in FIG. 2A. For example, the processor 120 may store execution information for a week to be overlapped on the graph shown in FIG. 2A. The date information indicating execution is omitted on the graph of FIG. 2A, and the processor 120 may not use the date information, when the usage pattern information on the graph is used. However, as time passes, the processor 120 may remove the execution information stored for a week from the graph.

According to the execution information stored in another time zone of FIG. 2A, the processor 120 may provide a guide leading to execution of a sub-function or a guide leading to execution of another function. For example, when the application A is executed at about 13:00 and then the function b is executed, the processor 120 may provide a guide leading to execution of the sub-function bb of the function b provided by the application A. In addition, when the application A is executed at about 20:00 and the function a is executed, the processor 120 may provide a guide leading to execution of the function b provided by the application A.

The execution information shown in FIG. 2A is merely an embodiment, and any other embodiments may be stored as execution information. For example, the processor 120 may store correlations between various pieces of execution information such as execution information of the application B after execution of the application A, execution information of the application B after execution of the sub-function aa, execution information of the function provided by the application B after execution of the function provided by the application A, and the like.

As shown in FIG. 2B, the processor 120 may generate usage pattern information separately from the execution information. For convenience of description, FIG. 2B shows that the execution of the application A and the execution of the function a provided by the application A are sequentially performed, such execution information is stored as Aa, the execution of the application B and the execution of the function b provided by the application B are sequentially performed, and such execution information is stored as Bb. In addition, the usage pattern information is generated by dividing into a plurality of time sections, and FIG. 2B shows only usage pattern information generated in a time section from 8:00 a.m. to 9:00 a.m.

The processor 120 may store the execution information as shown on the left side of FIG. 2B. The execution information is stored in the same manner as in FIG. 2A, and thus, the overlapped description regarding this will be omitted.

When the same execution information is repeated by the predetermined number of times or more for the predetermined time section, the processor 120 may store the corresponding execution information as the usage pattern information. For example, as shown on the left side of FIG. 2B, when the number of times of the execution information of Aa is 3, the number of times of the execution information of Bb is 1, and the predetermined number of times is 3, the processor 120 may generate the usage pattern information regarding Aa, as shown on the right side of FIG. 2B.

When the application A is executed from 9:00 a.m. to 9:00 a.m. in a state where the usage pattern information shown in FIG. 2B is generated, the processor 120 may generate a guide leading to execution of the function a provided by the application A. However, since the execution information and the usage pattern information are separately generated, the processor 120 may not generate any guide, even when the application B is executed from 8:00 a.m to 9:00 a.m.

The time section of FIG. 2B is merely an embodiment, and may be divided into any other time sections. In addition, only the application A and the function a provided by the application A have been described, but is not limited thereto, and as shown in FIG. 2A, the processor 120 may store various cases as the usage pattern information.

Figure 3A:
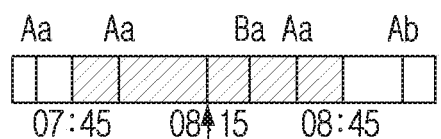
FIGS. 3A and 3B are views for describing a method for obtaining information and the like regarding a function according to an embodiment.
Figure 3A:
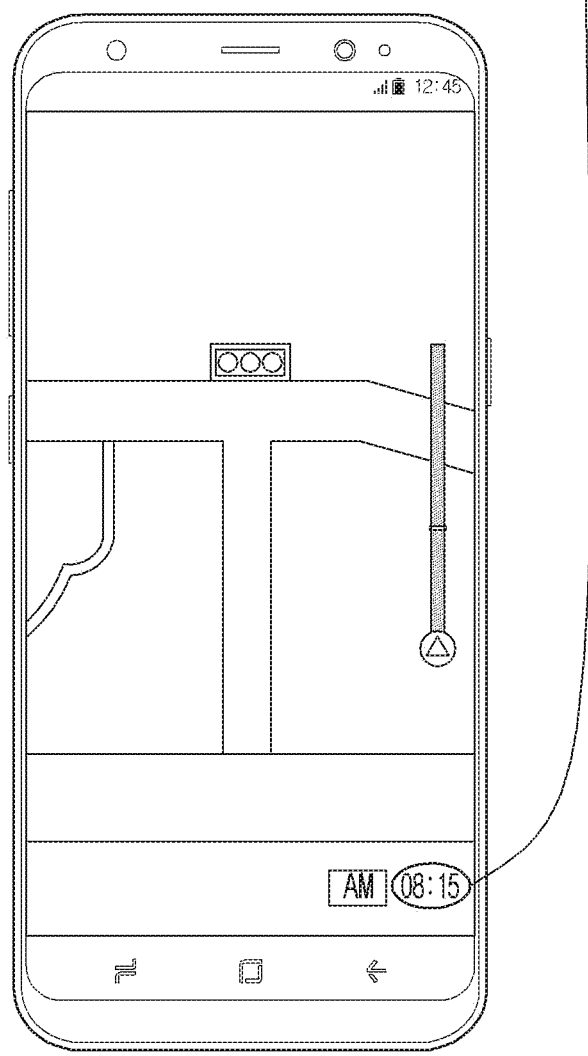
Figure 3B:
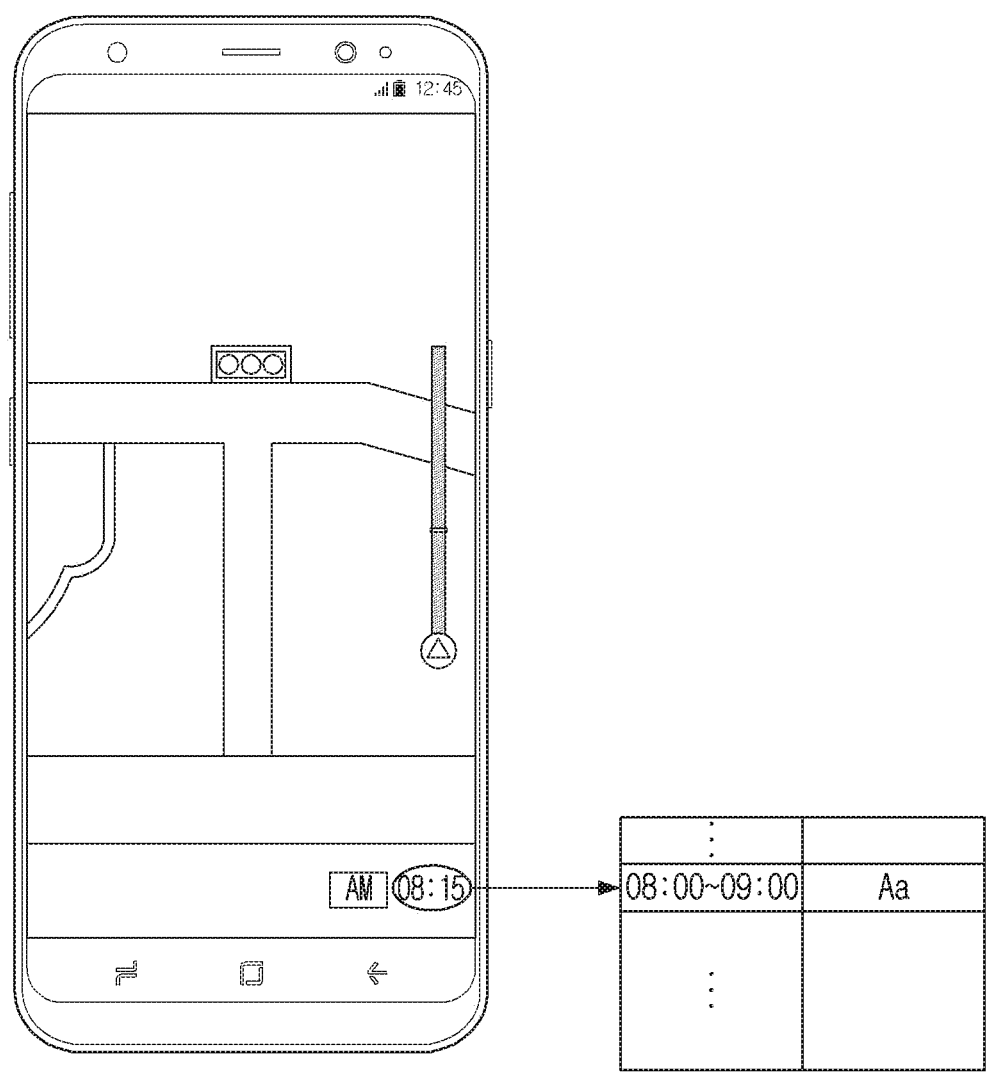

FIGS. 3A and 3B are views for describing a method for obtaining information and the like regarding a function according to an embodiment of the disclosure. The user terminal device 100 may store usage pattern information in advance, and the processor 120 may obtain information regarding at least one function executed at the execution point of the application based on the information regarding the time when each of the plurality of functions is executed.

First, as shown in FIG. 3A, the processor 120 may obtain usage pattern information during a predetermined time section based on the time when the function is executed. For example, the processor 120 may obtain usage pattern information from 7:15 a.m. to 8:45 a.m. which is one time section based on 8:15 a.m. at which the function is executed. At this time, the usage pattern information includes the execution information of the function a after execution of the application A and the execution information of the function b after execution of the application B, and the processor 120 may provide a guide leading to execution of the function a or the function b, when the executed application is the application A or the application B. In addition, when the executed application is an application C, the processor 120 may not provide any guide.

As shown in FIG. 3B, the processor 120 may obtain usage pattern information from the time section including the time when the function is executed. That is, the embodiment of FIG. 3B is an embodiment corresponding to FIG. 2B, and the processor 120 may generate usage pattern information generated by dividing into a plurality of time sections.

For example, when the execution point of the application is 8:15 a.m., the processor 120 may obtain usage pattern information from 8:00 a.m. to 9:00 a.m. which is the time section including the execution point. When usage pattern information corresponding to the executed application is stored, the processor 120 may provide a guide based on the corresponding usage pattern information.

In FIGS. 3A and 3B, only the feature of providing a guide leading to execution of the function according to the execution of the application is limitedly described, but this is for convenience of description, and there is no limitation thereto. For example, the processor 120 may provide a guide leading to execution of a sub-function of a function executed according to the execution of the function, provide a guide leading to execution of another application according to the execution of the function, or provide a guide leading to execution of another application according to the execution of the application.

Figure 4A:
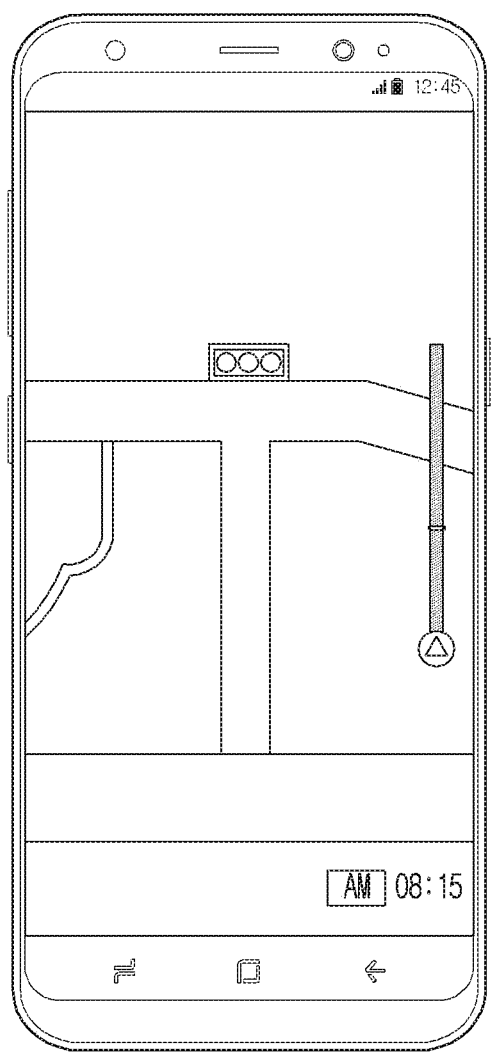
FIGS. 4A and 4B are views for describing a method for providing a guide according to an embodiment.
Figure 4A:
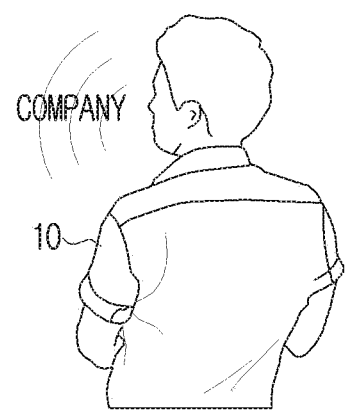
Figure 4B:
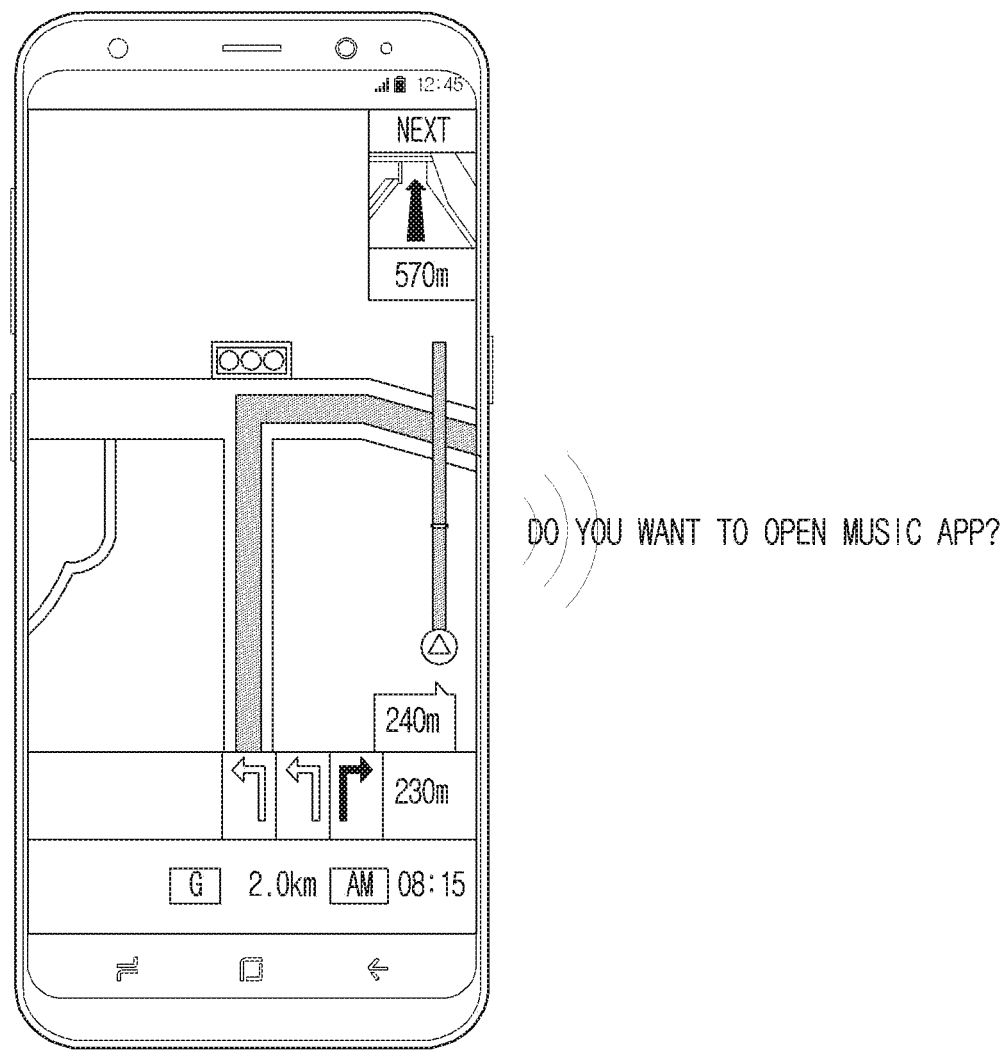

FIGS. 4A and 4B are views for describing a method for providing a guide according to an embodiment of the disclosure.

For example, as shown in FIG. 4A, when the navigation application is executed, the processor 120 may search for usage pattern information corresponding to the navigation application. The processor may provide a guide such as "Please set destination" for executing a route guide function, based on usage pattern information indicating that the route guide function provided by the navigation application is executed when the navigation application is executed.

The processor 120 may obtain the usage pattern information based on, not only the type and the execution time of the application, but also the context of the user terminal device 100 including the position and the illuminance of the user terminal device 100. For example, when the usage pattern information is information in that the route guide function provided by the navigation application is executed after the navigation application is executed in the house or the company of a user, the processor 120, when the navigation application is executed, may grasp the position of the user terminal device 100 and may provide a guide for execution of the route guide function, only in a case where the position thereof is the house or the company.

The processor 120 may provide a sound corresponding to the guide through the speaker 180. When a user designates the destination as "company" according to the guide, the processor 120 may execute the route guide function, as shown in FIG. 4B. The processor 120 may provide a GUI corresponding to the guide through the display 140.

When the route guide function is executed, the processor 120 may search for the usage pattern information corresponding to the route guide function. The processor 120 may provide a guide such as "Do you want to open music App?" for executing the music application, based on usage pattern information indicating that the music application is executed when the route guide function is executed.

The usage pattern information corresponding to the route guide function may be usage pattern information indicating that a sub-function of the route guide function such as a route type setting is executed when the route guide function is executed. In this case, the processor 120 may provide a guide "From shortest route first, free route first, and shortest time route first, which route do you want to select?" for executing the sub-function.

In addition, the processor 120 may consecutively provide guides. In the embodiment described above, when the music application is executed, the processor 120 may obtain the usage pattern information corresponding to the music application. For example, the usage pattern information may be information indicating that "classic music collection" is executed after executing the music application. When the music application is executed, the processor 120 may provide a guide such as "Do you want to play classic music collection?" based on the usage pattern information.

The processor 120 may consecutively provide guides by such a method. However, there is no limitation thereto, and the processor 120 may provide a guide only for a predetermined first time after providing a first guide, and may not provide a guide for a predetermined second time. The processor 120 may provide a guide again after the second time passes.

The processor 120 may limit the number of times of the guides provided during the predetermined first time after providing the first guide. The processor 120 may provide only 5 guides for 10 minutes after providing the first guide.

Figure 5:
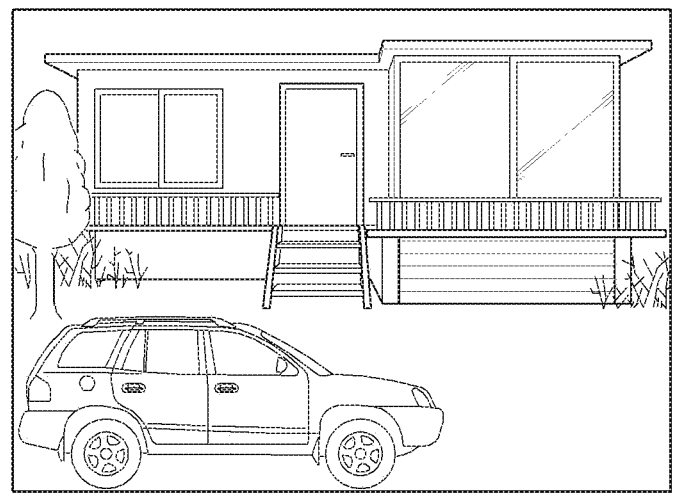
FIG. 5 is a view for describing execution of an application based on a context according to an embodiment.
Figure 5:
Figure 5:
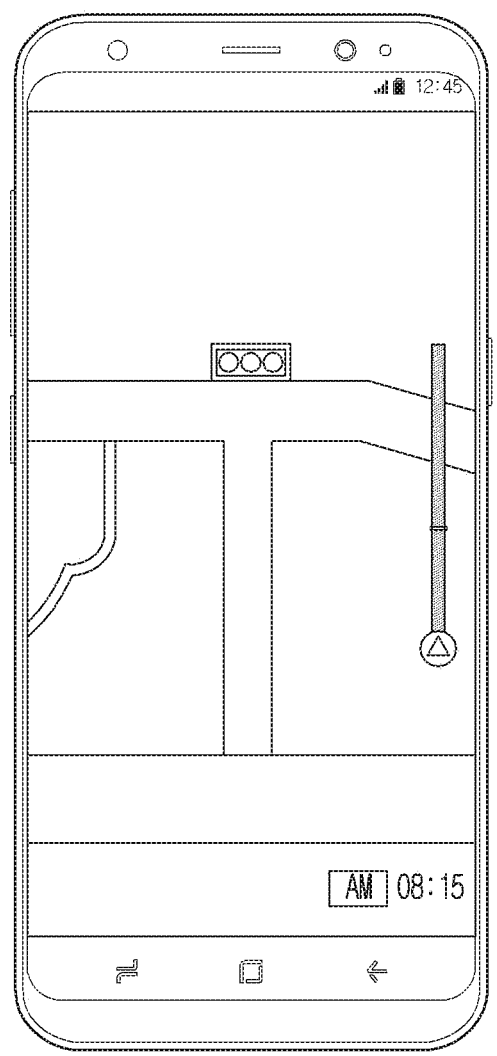

FIG. 5 is a view for describing execution of the application based on the context according to an embodiment of the disclosure.

As shown in FIG. 5, when a user gets in a car, the processor 120 may recognize the car as a Bluetooth device. In this case, the processor 120 may execute the navigation application.

In addition, the processor 120 may determine that the user terminal device 100 is positioned in a car based on position information, temperature information, illuminance information, and the like of the user terminal device 100 and execute the navigation application.

For example, the processor 120 may determine that the user terminal device 100 is positioned in the vicinity of a car park based on the position information of the user terminal device 100. When a user gets in a car and the temperature or the illuminance is changed, the processor 120 may determine that a user gets in a car and execute the navigation application.

Figure 6:
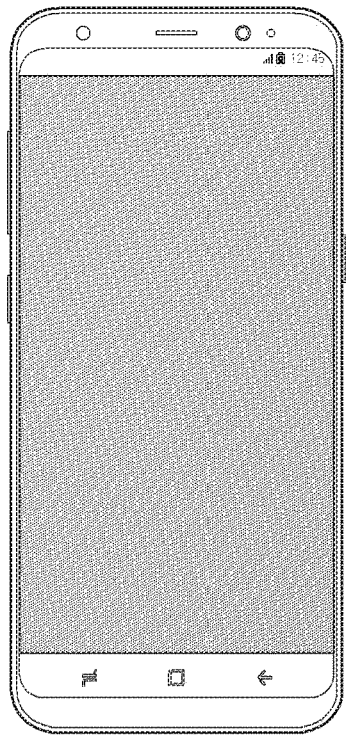
FIG. 6 is a view for describing a required input according to an embodiment.
Figure 6:
Figure 6:
Figure 6:

FIG. 6 is a view for describing a required input according to an embodiment of the disclosure.

The processor 120 may provide a guide requesting required input information to a user. For example, as shown in FIG. 6, when a speech such as "Open webtoon application and show webtoon A" is input from a user, the processor 120 may provide a guide such as "Please enter episode number of webtoon a you wish to read". The required input of the webtoon application herein may be the type of webtoon and episode number.

Such information regarding the required input may be stored in the storage in advance for each application and function.

For example, the storage 110 may store destination information as the required input regarding the route guide function of the navigation application. The storage 110 may store music list information as the required input regarding the play function of the music application. The storage 110 may store information regarding a departure point, a destination, a departure date, a return date, flight class, and the like as the required inputs regarding a flight searching function of the flight booking application. The storage 110 may store information regarding a target and a message content as the required inputs regarding a message transmission function of the messaging application.

The processor 120 may provide a guide requesting additionally necessary information to a user based on the information stored in the storage 110.

Figure 7:
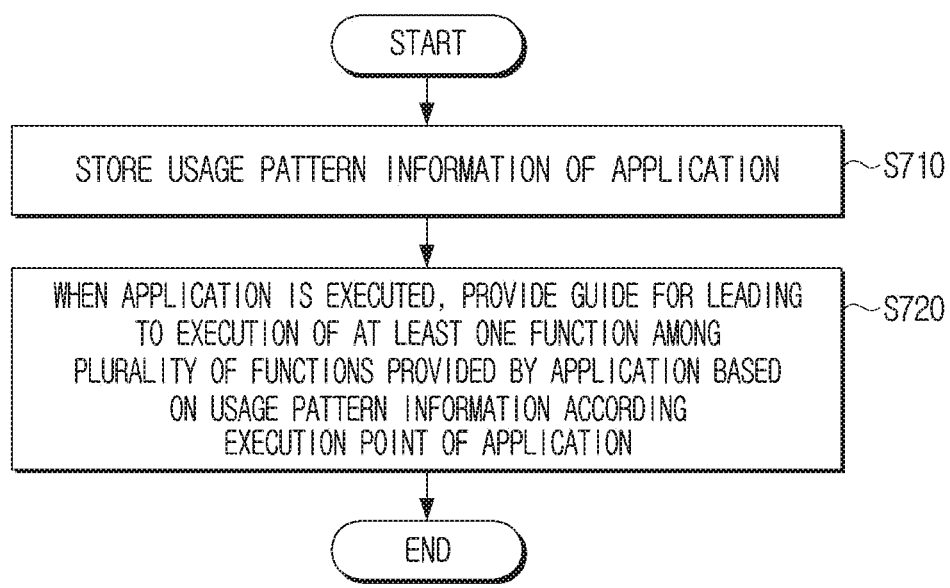
FIG. 7 is a flowchart for describing a method for controlling a user terminal device according to an embodiment.

FIG. 7 is a flowchart for describing a method for controlling the user terminal device according to an embodiment of the disclosure.

First, usage pattern information of an application is stored (S710). When the application is executed, a guide leading to execution of at least one function among a plurality of functions provided by the application is provided based on the usage pattern information according to an execution point of the application (S720).

The usage pattern information of the application includes information regarding time when each of the plurality of functions is executed, and the step S720 of providing a guide may include obtaining information regarding the at least one function executed at an execution point of the application based on information regarding time when each of the plurality of functions is executed.

The usage pattern information of the application includes information regarding another application additionally executed after each of the plurality of function is executed, and the method may further include, when the at least one function is executed by inputting a user command according to the guide, executing another application based on the usage pattern information of the application.

The method may further include, when the at least one function is executed by inputting a user command according to the guide, providing a guide leading to execution of at least one sub-function among a plurality of sub-functions corresponding to the executed function based on usage pattern information.

The method may further include detecting a context of the user terminal device and executing the application based on the detected context.

The usage pattern information of the application includes information regarding time when each of the plurality of functions is executed for each position of the user terminal device, and the step S720 of providing a guide may include obtaining information regarding the at least one function based on information regarding the position of the user terminal device and time when each of the plurality of functions is executed.

The step S720 of providing a guide may include providing a guide leading to execution of the at least one function based on information regarding a function executed in a predetermined time section based on the execution point of the application.

The step S710 of storing may include, when the number of times of execution of the function of the application at the predetermined time is equal to or more than the predetermined number of times, generating and storing usage pattern information including the predetermined time and the function.

The step S720 of providing a guide may include outputting at least one of a sound and a GUI corresponding to the guide through at least one of a speaker and a display.

According to various embodiments of the disclosure described above, when the application is executed, the user terminal device may provide a guide leading to execution of the function provided by the application based on the usage pattern information, and accordingly, an operation of additional control for executing a function that a user want to execute may be omitted.

According to an embodiment of the disclosure, various embodiments described above may be implemented as software including instructions stored in machine (e.g., computer)-readable storage media. The machine is a device which invokes instructions stored in the storage medium and is operated according to the invoked instructions, and may include an electronic device (e.g., electronic device 100) according to the disclosed embodiments. In a case where the instruction is executed by a processor, the processor may execute a function corresponding to the instruction directly or using other elements under the control of the processor. The instruction may include a code generated by a compiler or executed by an interpreter. The machine-readable storage medium may be provided in a form of a non-transitory storage medium. Here, the term "non-transitory" merely mean that the storage medium is tangible while not including signals, and it does not distinguish that data is semi-permanently or temporarily stored in the storage medium.

According to an embodiment of the disclosure, the methods according to various embodiments described above may be provided to be included in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

According to an embodiment of the disclosure, the embodiments described above may be implemented in a recording medium readable by a computer or a similar device using software, hardware, or a combination thereof. In some cases, the embodiments described in this specification may be implemented as a processor itself. According to the implementation in terms of software, the embodiments such as procedures and functions described in this specification may be implemented as software modules. Each of the software modules may execute one or more functions and operations described in this specification.

Computer instructions for executing processing operations of the device according to the embodiments descried above may be stored in a non-transitory computer-readable medium. When the computer instructions stored in such a non-transitory computer-readable medium are executed by the processor of a specific machine, the computer instructions may enable a specific machine to execute the processing operations according to the embodiments described above. The non-transitory computer-readable medium is not a medium storing data for a short period of time such as a register, a cache, or a memory, but means a medium that semi-permanently stores data and is readable by a machine. Specific examples of the non-transitory computer-readable medium may include a CD, a DVD, a hard disk, a Blu-ray disc, a USB, a memory card, and a ROM.

In addition, each of the elements (e.g., a module or a program) according to various embodiments described above may be composed of a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to integration. Operations performed by a module, a program, or other elements, in accordance with various embodiments, may be performed sequentially, in a parallel, repetitive, or heuristically manner, or at least some operations may be performed in a different order, omitted, or may add a different operation.

Hereinabove, the preferred embodiments of the disclosure have been shown and described, but the disclosure is not limited to specific embodiments described above, various modifications may be made by those skilled in the art without departing from the gist of the disclosure claimed in the claims, and such modifications may not be individually understood from the technical sprit or the prospect of the disclosure.

What is claimed is:

1. A user terminal device comprising:
a communicator;
a storage storing usage information comprising execution information of functions of at least one application executed within a predetermined time section and context information of the user terminal device corresponding to the predetermined time section, the execution information including information related to execution sequence of a first function of a first application and a second function of a second application; and
a processor configured to:
based on a usage event corresponding the usage information being equal to or more than a predetermined number of times, store relation information between the functions of the at least one application and the context information of the user terminal device as usage pattern information in the storage,
based on identifying the context information corresponding to the usage pattern information, execute the first function of the first application based on the relation information,
based on the execution information corresponding to the usage pattern information, identify the second function of the second application to be executed after the first function of the first application, and
provide a guide leading to execution of the identified second function of the second application.

2. The device according to claim 1,
wherein the execution information of the application comprises information regarding time when each of the functions is executed, and
wherein the processor is further configured to obtain information regarding the at least one function executed at a execution point of the application based on the information regarding time Previously Presented when each of the functions is executed.

3. The device according to claim 1,
wherein the execution information of the application comprises information regarding another application additionally executed after execution of each of the functions, and
wherein the processor is further configured to, based on the at least one function being executed by inputting a user command according to the guide, execute the another application based on the execution information of the application.

4. The device according to claim 1, wherein the processor is further configured to, based on the at least one function being executed by inputting a user command according to the guide, provide a guide leading to execution of at least one sub-function among a plurality of sub-functions corresponding to the executed function based on the execution information.

5. The device according to claim 1, further comprising:
a sensor,
wherein the processor is further configured to execute the application based on a context of the user terminal device detected through the sensor.

6. The device according to claim 1,
wherein the execution information of the application comprises information regarding time when each of the functions is executed for each position of the user terminal device, and
wherein the processor is further configured to obtain information regarding the at least one function based on information regarding position of the user terminal device and time when each of the functions is executed.

7. The device according to claim 1, wherein the processor is further configured to provide a guide leading to execution of the at least one function based on information regarding a function executed within a predetermined time section based on an execution point of the application.

8. The device according to claim 1, wherein the processor is further configured to, based on a number of times of execution of the function of the application in a predetermined time being equal to or more than a predetermined number of times, generate and store the execution information including the predetermined time and the function.

9. The device according to claim 1, further comprising:
a speaker; and
a display,
wherein the processor is further configured to control at least one of the speaker and the display to output at least one of a sound and a GUI corresponding to the guide.

10. A method for controlling a user terminal device, the method comprising:
storing usage information comprising execution information of functions of at least one application executed within a predetermined time section and context information of the user terminal device corresponding to the predetermined time section, the execution information including information related to execution sequence of a first function of a first application and a second function of a second application;
based on a usage event corresponding the usage information being equal to or more than a predetermined number of times, store relation information between the functions of the at least one application and the context information of the user terminal device as usage pattern information in a storage;
based on identifying the context information corresponding to the usage pattern information, executing the first function of the first application based on the relation information;
based on the execution information corresponding to the usage pattern information, identifying the second function of the second application to be executed after the first function of the first application; and
providing a guide leading to execution of the identified second function of the second application.

11. The method according to claim 10,
wherein the execution information of the application comprises information regarding time when each of the functions is executed, and
wherein the providing a guide comprises obtaining information regarding the at least one function executed at a execution point of the application based on the information regarding time when each of the functions is executed.

12. The method according to claim 10,
wherein the execution information of the application comprises information regarding another application additionally executed after execution of each of the functions, and
wherein the method further comprises, based on the at least one function being executed by inputting a user command according to the guide, executing the another application based on the execution information of the application.

13. The method according to claim 10, further comprising:
based on the at least one function being executed by inputting a user command according to the guide, providing a guide leading to execution of at least one sub-function among a plurality of sub-functions corresponding to the executed function based on the execution information.

14. The method according to claim 10, further comprising:
detecting a context of the user terminal device; and
executing the application based on the detected context.

15. The method according to claim 10,
wherein the execution information of the application comprises information regarding time when each of the functions is executed for each position of the user terminal device, and
wherein the providing a guide comprises obtaining information regarding the at least one function based on information regarding position of the user terminal device and time when each of the functions is executed.

* * * * *